(12) United States Patent
Ishii

(10) Patent No.: US 12,283,221 B2
(45) Date of Patent: Apr. 22, 2025

(54) DISPLAY CONTROL DEVICE, DISPLAY CONTROL METHOD, AND PROGRAM

(71) Applicant: Sharp NEC Display Solutions, Ltd., Tokyo (JP)

(72) Inventor: Eisaku Ishii, Tokyo (JP)

(73) Assignee: SHARP NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 18/398,819

(22) Filed: Dec. 28, 2023

(65) Prior Publication Data

US 2024/0135860 A1 Apr. 25, 2024
US 2024/0233610 A9 Jul. 11, 2024

Related U.S. Application Data

(63) Continuation of application No. PCT/JP2022/026842, filed on Jul. 6, 2022.

(30) Foreign Application Priority Data

Jul. 9, 2021 (WO) .................. PCT/JP2021/026040

(51) Int. Cl.
*G09G 3/30* (2006.01)
*G06F 3/01* (2006.01)

(52) U.S. Cl.
CPC ............ *G09G 3/30* (2013.01); *G06F 3/011* (2013.01); *G09G 2320/028* (2013.01); *G09G 2320/068* (2013.01)

(58) Field of Classification Search
CPC ............ G09G 3/30; G09G 2320/028; G09G 2320/068; G06F 3/011
See application file for complete search history.

(56) References Cited

U.S. PATENT DOCUMENTS

2005/0184944 A1* 8/2005 Miyata ................ G09G 3/3611
345/89
2017/0269684 A1 9/2017 Murai
(Continued)

FOREIGN PATENT DOCUMENTS

JP 2010-535362 A 11/2010
JP 2011-077913 A 4/2011
(Continued)

OTHER PUBLICATIONS

International Search Report in PCT/JP2022/026842 dated Sep. 27, 2022 with English translation thereof.

*Primary Examiner* — Abbas I Abdulselam
(74) *Attorney, Agent, or Firm* — MCGINN I.P. LAW GROUP, PLLC

(57) ABSTRACT

A display control device includes a visual field determination unit configured to determine whether or not a display device for displaying content is included in a visual field of a person included in an image captured by an imaging device that images a region around the display device, a central visual field determination unit configured to determine whether or not the display device is included in a central visual field within the visual field, and a change determination unit configured to determine whether or not to temporarily change a display mode of the display device displaying first content before the content is switched from the first content displayed on the display device to second content to be subsequently displayed when it is determined that the display device is included in the visual field but is not included in the central visual field.

20 Claims, 12 Drawing Sheets

(56) References Cited

U.S. PATENT DOCUMENTS

| | | |
|---|---|---|
| 2019/0109939 A1 | 4/2019 | Tsuji |
| 2020/0211440 A1* | 7/2020 | Lee ...................... G06F 1/1677 |
| 2024/0104883 A1* | 3/2024 | Hashimoto ............. G06F 3/013 |

FOREIGN PATENT DOCUMENTS

| | | |
|---|---|---|
| JP | 2017-170949 A | 9/2017 |
| JP | 2019-128910 A | 8/2019 |
| WO | WO 2008/108965 A | 9/2008 |
| WO | WO 2017/183129 A1 | 10/2017 |

\* cited by examiner

… (1)

DISPLAY CONTROL DEVICE, DISPLAY CONTROL METHOD, AND PROGRAM

Priority is claimed on PCT International Patent Application No. PCT/JP2021/026040, filed Jul. 9, 2021, the content of which is incorporated herein by reference.

TECHNICAL FIELD

The present invention relates to a display control device, a display control method, and a program.

BACKGROUND ART

In the related art, various types of technologies have been proposed for controlling content to be displayed in accordance with whether or not a person located in a nearby area is interested in a display device such as digital signage that displays content of advertisements and the like.

For example, in the following Patent Document 1, technology for displaying content on a display device for a person who is interested in the display device is disclosed. In the technology, for example, a person facing the display device is detected from an orientation of a face of the person and content is displayed for the detected person.

CITATION LIST

Patent Document

Patent Document 1

Japanese Unexamined Patent Application, First Publication No. 2019-128910

SUMMARY OF INVENTION

Technical Problem

As described above, in the technology of Patent Document 1, a person facing a display device can watch content according to his or her own will. However, even if a person is at a position where the displayed content can be watched, the person who is not facing the display device cannot watch the content and the loss of an opportunity to watch the content occurs.

In view of the above-described problems, an objective of the present invention is to provide a display control device, a display control method, and a program capable of reducing the loss of an opportunity to watch content.

Solution to Problem

In order to solve the above-described problems, according to an aspect of the present invention, there is provided a display control device including: a visual field determination unit configured to determine whether or not a display device for displaying content is included in a visual field of a person included in an image captured by an imaging device that images a region around the display device; a central visual field determination unit configured to determine whether or not the display device is included in a central visual field within the visual field; and a change determination unit configured to determine whether or not to temporarily change a display mode of the display device displaying first content before the content is switched from the first content displayed on the display device to second content to be subsequently displayed when it is determined that the display device is included in the visual field but is not included in the central visual field.

According to an aspect of the present invention, there is provided a display control method including: a visual field determination process in which a visual field determination unit determines whether or not a display device for displaying content is included in a visual field of a person included in an image captured by an imaging device that images a region around the display device; a central visual field determination process in which a central visual field determination unit determines whether or not the display device is included in a central visual field within the visual field; and a change determination process in which a change determination unit determines whether or not to temporarily change a display mode of the display device displaying first content before the content is switched from the first content displayed on the display device to second content to be subsequently displayed when it is determined that the display device is included in the visual field but is not included in the central visual field.

According to an aspect of the present invention, there is provided a program for causing a computer to function as: a visual field determination unit configured to determine whether or not a display device for displaying content is included in a visual field of a person included in an image captured by an imaging device that images a region around the display device; a central visual field determination unit configured to determine whether or not the display device is included in a central visual field within the visual field; and a change determination unit configured to determine whether or not to temporarily change a display mode of the display device displaying first content before the content is switched from the first content displayed on the display device to second content to be subsequently displayed when it is determined that the display device is included in the visual field but is not included in the central visual field.

According to an aspect of the present invention, there is provided a display control device including: a visual field determination unit configured to determine whether or not a display device is included in a visual field of a person included in an image captured by an imaging device that images a region around the display device that displays content having a finite playback period of time as digital signage; a central visual field determination unit configured to determine whether or not the display device is included in a central visual field within the visual field; and a content switching unit configured to switch the content from first content to second content to be subsequently displayed even if the playback of the first content displayed on the display device is in progress when it is determined that the display device is included in the visual field but is not included in the central visual field.

According to an aspect of the present invention, there is provided a display control method including: a visual field determination process in which a visual field determination unit determines whether or not a display device is included in a visual field of a person included in an image captured by an imaging device that images a region around the display device that displays content having a finite playback period of time as digital signage; a central visual field determination process in which a central visual field determination unit determines whether or not the display device is included in a central visual field within the visual field; and a content switching process in which a content switching unit switches the content from first content to second content to be subsequently displayed even if the playback of the first content displayed on the display device is in progress when it is determined that the display device is included in the visual field but is not included in the central visual field.

According to an aspect of the present invention, there is provided a program for causing a computer to function as: a visual field determination unit configured to determine whether or not a display device is included in a visual field of a person included in an image captured by an imaging device that images a region around the display device that displays content having a finite playback period of time as digital signage; a central visual field determination unit configured to determine whether or not the display device is included in a central visual field within the visual field; and a content switching unit configured to switch the content from first content to second content to be subsequently displayed even if the playback of the first content displayed on the display device is in progress when it is determined that the display device is included in the visual field but is not included in the central visual field.

Advantageous Effects of Invention

According to the present invention, it is possible to reduce the loss of an opportunity to watch content.

DESCRIPTION OF EMBODIMENTS

Figure 1:
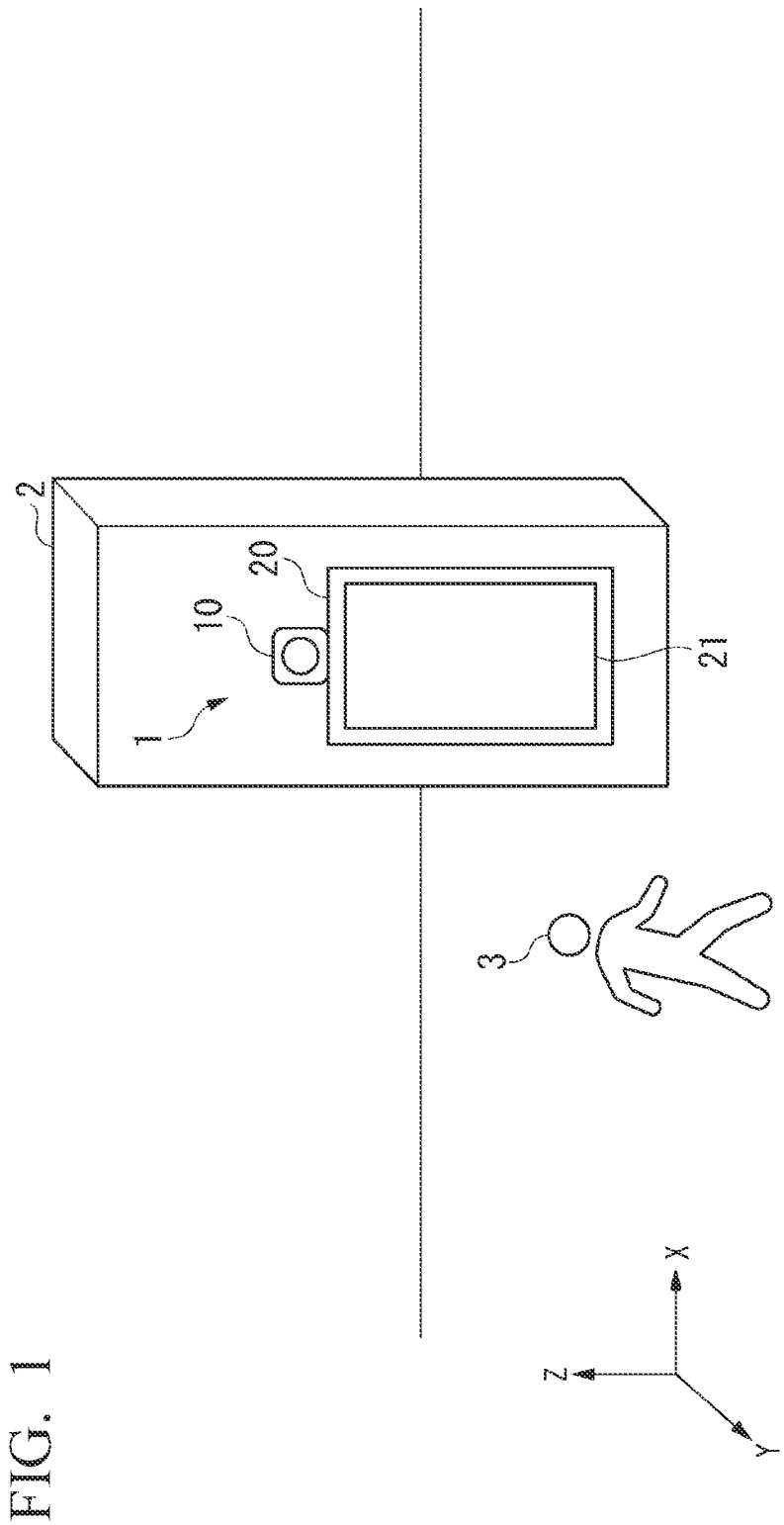
FIG. 1 is a diagram showing an outline of a display system according to a first embodiment.

Hereinafter, each embodiment of the present invention will be described in detail with reference to the drawings.

First, a first embodiment of the present invention will be described. In the drawings, an X-axis, a Y-axis, and a Z-axis orthogonal to each other are shown as necessary. The X-axis, the Y-axis, and the Z-axis are common to all drawings. In each axis, a direction in which an arrow extends is referred to as a "positive direction" and a direction opposite the positive direction is referred to as a "negative direction."

1. First Embodiment

First, a first embodiment of the present invention will be described.
<1-1. Outline of Display System>
An outline of the display system according to the first embodiment will be described with reference to FIG. 1. FIG. 1 is a diagram showing the outline of the display system 1 according to the first embodiment. As shown in FIG. 1, the display system 1 includes an imaging device 10 and a display device 20.

The imaging device 10 and the display device 20 are connected so that they can transmit and receive information to and from each other. For example, the imaging device 10 and the display device 20 are connected through a local area network (LAN). The LAN may be implemented through a wired connection or through a wireless connection such as Bluetooth (registered trademark) or Wi-Fi (registered trademark).

(1) Imaging Device 10

The imaging device 10 is a device for imaging a region around the display device 20. The imaging device 10 is, for example, a camera. The imaging device 10 according to the first embodiment is a device independent of the display device 20 and is provided on an upper part of the display device 20, for example, as shown in FIG. 1.

Also, the imaging device 10 is not limited to a device independent of the display device 20 and may be a device built into the display device 20. Also, a position where the imaging device 10 is provided is not limited to such examples. For example, the imaging device 10 may be provided at any position of a lower, left, or right portion of the display device 20 or may be provided on a wall surface, a pillar, a ceiling, or the like of a building.

When a person located near the display device 20 is located within a range in which an imaging process of the imaging device 10 is possible, the imaging device 10 captures an image (a still image or a moving image) including the person. For example, in the case of the example shown in FIG. 1, the imaging device 10 captures an image including a person 3. The imaging device 10 transmits the captured image to the display device 20.

(2) Display Device 20

The display device 20 is a device for displaying content on the display screen 21 and is an example of a display control device. As, for example, digital signage, the display device 20 displays content having a finite playback period of time. The content is, for example, an image (a still image or a moving image) indicating an advertisement or the like. The display device 20 according to the first embodiment is provided vertically on a pillar 2 of a building as shown in FIG. 1.

Also, a position and an orientation in which the display device 20 is provided are not limited to such examples. For example, the display device 20 may be provided on a wall surface of a building, may be installed using a stand, or may be oriented sideways.

The display screen 21 is, for example, a liquid crystal display, a plasma display, an organic electro-luminescence (EL) display, or the like. Also, the display device 20 is not limited to a display, and may be, for example, a projector. In the case of a projector, content is displayed by projecting the content from the projector onto a screen, a wall surface, or the like.

<1-2. Functional Configuration of Display Device>

Figure 2:
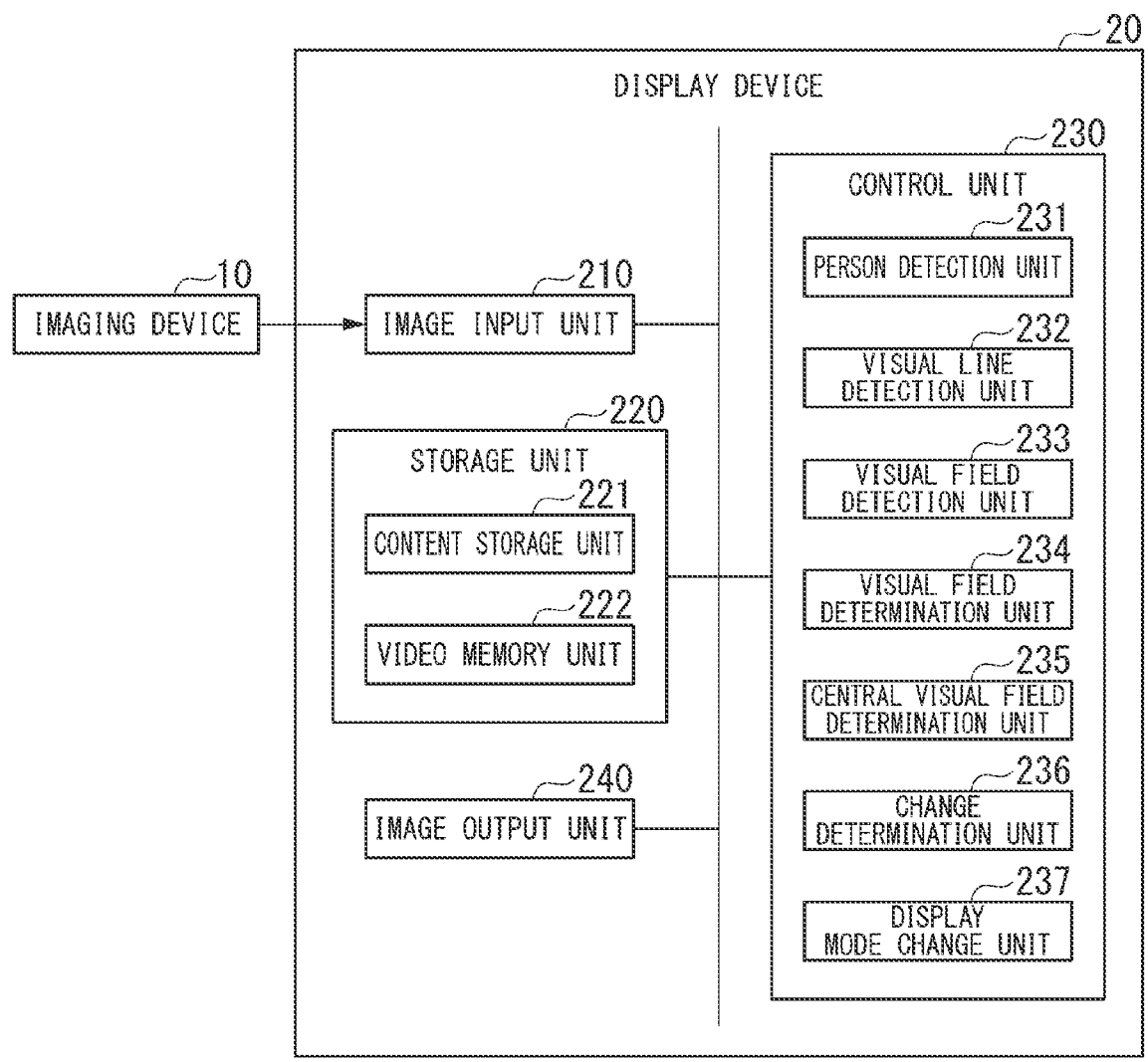
FIG. 2 is a block diagram showing an example of a functional configuration of a display device according to the first embodiment.

The outline of the display system 1 according to the first embodiment has been described above. Next, a functional configuration of the display device 20 according to the first embodiment will be described. FIG. 2 is a block diagram showing an example of the functional configuration of the display device 20 according to the first embodiment.

As shown in FIG. 2, the display device 20 includes an image input unit 210, a storage unit 220, a control unit 230, and an image output unit 240.

(1) Image Input Unit 210

The image input unit 210 has a function of inputting an image. For example, the image input unit 210 acquires a captured image from the imaging device 10 and inputs the acquired captured image to the control unit 230.

(2) Storage Unit 220

The storage unit 220 includes storage media such as a hard disk drive (HDD), a solid-state drive (SSD), a flash memory, an electrically erasable programmable read-only memory (EEPROM), a random access read/write memory (RAM), a read-only memory (ROM), and any combination of these storage media.

As shown in FIG. 2, the storage unit 220 includes a content storage unit 221 and a video memory unit 222.

(2-1) Content Storage Unit 221

The content storage unit 221 has a function of storing content. For example, the content storage unit 221 stores previously provided content displayed on the display screen 21.

(2-2) Video Memory Unit 222

The video memory unit 222 has a function of storing information necessary for displaying content on the display screen 21.

(3) Control Unit 230

The control unit 230 has a function of controlling an overall operation of the display device 20. The control unit 230 is implemented, for example, by causing a central processing unit (CPU) provided as hardware for the display device 20 to execute a program.

As shown in FIG. 2, the control unit 230 includes a person detection unit 231, a visual line detection unit 232, a visual field detection unit 233, a visual field determination unit 234, a central visual field determination unit 235, a change determination unit 236, and a display mode change unit 237.

(3-1) Person Detection Unit 231

The person detection unit 231 has a function of detecting a person. For example, the person detection unit 231 detects a person included in a captured image. Specifically, the person detection unit 231 detects the person included in the captured image in an image recognition process for the captured image input from the image input unit 210.

A process in which the person detection unit 231 detects the person from the captured image is also hereinafter referred to as a "person detection process."

(3.2) Visual Line Detection Unit 232

The visual line detection unit 232 has a function of detecting a visual line of a person. For example, the visual line detection unit 232 detects the visual line of the person detected from the captured image. As an example, the visual line detection unit 232 estimates the visual line from facial feature points of the person detected by the person detection unit 231. The facial feature points are, for example, features relating to the surroundings of the eye, such as an inner corner of the eye, an outer corner of the eye, and a pupil. The visual line detection method is not limited to this example. For example, the visual line may be detected from an orientation of the person's face, a body posture, and the like.

A process in which the visual line detection unit 232 detects the visual line of the person detected from the captured image is also hereinafter referred to as a "visual line detection process."

(3-3) Visual Field Detection Unit 233

The visual field detection unit 233 has a function of detecting the visual field of the person. In general, a range of the visual field of the person is from about 90 degrees to about 100 degrees on the ear side in one eye and is from about 180 degrees to about 200 degrees on the ear side in a combination of the left and right. A visual field of the person is divided into a central visual field and a peripheral visual field. The central visual field is within the visual field. A range of about 30 degrees on the ear side in one eye and about 60 degrees in the combination of the left and right is the central visual field and a range other than the central visual field is the peripheral visual field. The central visual field is a range within about 30 degrees near the center of the visual line within the person's visual field and is a visual field that the person consciously sees. The peripheral visual field is a range other than the central visual field within the person's visual field and is a visual field that a person sees unconsciously.

As described above, ranges of central and peripheral visual fields of the person are known. The visual field detection unit 233 detects the visual field of the person using, for example, the fact that the central and peripheral visual fields of the person are known. Specifically, the visual field detection unit 233 detects the visual field, the central visual field, and the peripheral visual field of the person from an angle of the known visual field range and an angle of the known central visual field range using a direction of the visual line of the person detected by the visual line detection unit 232 as a reference.

A process of detecting the visual field of the person from the visual line of the person detected by the visual field detection unit 233 is also hereinafter referred to as a "visual field detection process."

(3-4) Visual Field Determination Unit 234

The visual field determination unit 234 has a function of determining whether or not the display device 20 is included in the visual field of the person. For example, the visual field determination unit 234 determines whether or not the display device 20 is included in the visual field of the person included in the captured image captured by the imaging device 10. Specifically, the visual field determination unit 234 determines whether or not the display device 20 is included in the visual field on the basis of the visual field of the person detected by the visual field detection unit 233.

A process in which the visual field determination unit 234 determines whether or not the display device 20 is included in the visual field of the person is also hereinafter referred to as a "visual field determination process."

(3-5) Central Visual Field Determination Unit 235

The central visual field determination unit 235 has a function of determining whether or not the display device 20 is included in the central visual field within the visual field of the person. For example, the central visual field determination unit 235 determines whether or not the display device 20 is included in the central visual field of the person detected by the visual field detection unit 233.

A process in which the central visual field determination unit 235 determines whether or not the display device 20 is included in the central visual field of the person is also hereinafter referred to as a "central visual field determination process."

In the present embodiment, when the visual field determination unit 234 determines that the display device 20 is included in the visual field of the person, the central visual field determination unit 235 performs the central visual field determination process. On the other hand, when the visual field determination unit 234 determines that the display device 20 is not included in the visual field of the person, the central visual field determination unit 235 does not perform the central visual field determination process. Thereby, the display device 20 can select at least a person whose visual field includes the display device 20 as a target and further select a person whose peripheral visual field includes the display device 20 as a target. Consequently, the display device 20 can select a person who is more likely to pay attention to the display device 20 as a target from among persons who are not paying attention to the display device 20. Also, the display device 20 can improve processing efficiency without performing the central visual field determination process when there is no person whose visual field includes the display device 20 in the first place.

Also, the order of the visual field determination process of the visual field determination unit 234 and the central visual field determination process of the central visual field determination unit 235 is not limited to this example. For example, the central visual field determination unit 235 may first perform the central visual field determination process and the visual field determination unit 234 may perform the visual field determination process in accordance with a result of determining the central visual field determination process. In this case, first, the central visual field determination unit 235 determines whether or not the display device 20 is included in the central visual field of the person detected by the visual field detection unit 233. When the display device 20 is included in the central visual field, the visual field determination unit 234 does not perform the visual field determination process. On the other hand, when the display device 20 is not included in the central visual field, the visual field determination unit 234 performs the visual field determination process.

Figure 3:
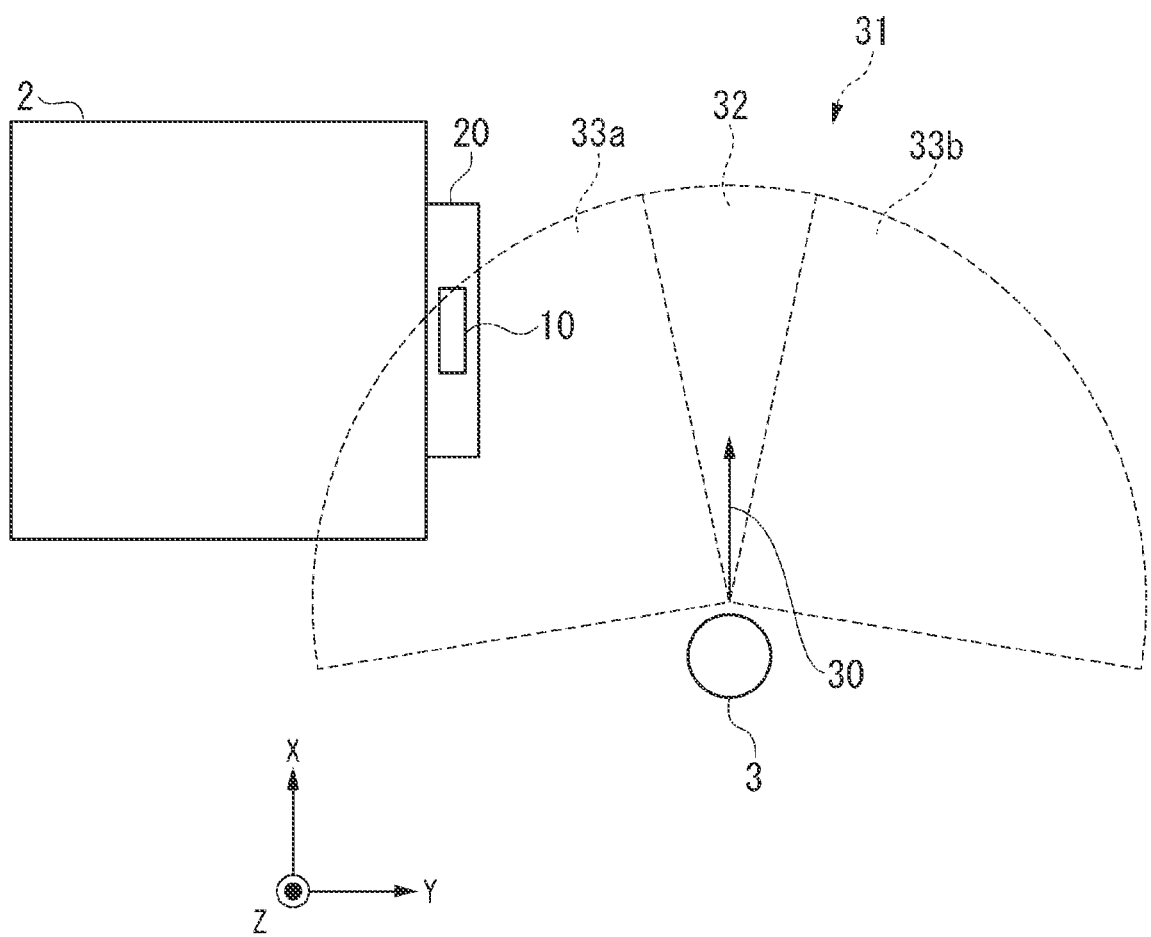
FIG. 3 is a diagram showing an example of a visual field of a person according to the first embodiment.

Here, the visual field of the person 3 will be described with reference to FIG. 3. FIG. 3 is a diagram showing an example of the visual field of the person 3 according to the first embodiment. In FIG. 3, a view of the display system of FIG. 1 seen from above the head of the person 3 (the positive direction of the Z-axis) is shown.

In FIG. 3, an arrow 30 indicates the direction of the visual line of the person 3. The visual line detection unit 232 detects the direction of the visual line of the person 3 indicated by the arrow 30 from the captured image.

A fan-shaped region 31 indicated by a dashed line indicates the visual field of the person 3. The visual field of the person 3 indicated by the region 31 is detected by the visual field detection unit 233.

The region 31 includes a region 32, a region 33a, and a region 33b. The region 32 indicates a central visual field of the person 3. The regions 33a and 33b indicate peripheral visual fields of the person 3. The central visual field indicated by the region 32 and the peripheral visual fields indicated by the region 33a and region 33b are detected by the visual field detection unit 233.

In the example shown in FIG. 3, at least a part of the display device 20 is included in the region 31 that is the visual field of the person 3. Therefore, the visual field determination unit 234 determines that the display device 20 is included in the visual field of the person 3. Further, the display device 20 is not included in the region 32, which is the central visual field of the person 3. Consequently, the central visual field determination unit 235 determines that the display device 20 is not included in the central visual field of the person 3.

As described above, in the example shown in FIG. 3, it is determined that the display device 20 is included in the visual field of the person 3 but not in the central visual field. That is, it can be said that the display device 20 is determined to be included in the peripheral visual field of the person 3.

(3-6) Change Determination Unit 236

The change determination unit 236 has a function of determining whether or not to change the display mode of the display device 20. For example, when it is determined that the display device 20 is included in the visual field of the person but is included not in the central visual field, the change determination unit 236 determines whether or not to temporarily change the display mode of the display device 200 displaying the content before the content is switched from content (first content) displayed on the display device 20 to content (second content) to be subsequently displayed.

A process in which the change determination unit 236 determines whether or not to change the display mode of the display device 20 is also hereinafter referred to as a "change determination process." The change determination unit 236 performs the change determination process on the basis of the content displayed on the display device 20 and the content to be subsequently displayed. The change determination unit 236 performs the change determination process using whether or not a degree of change in the display between before and after switching the content can sufficiently attract the eyes of a person as an index.

For example, the change determination unit 236 determines whether or not to change the display mode of the display device 20 on the basis of a comparison result between the content displayed on the display device 20 and the content to be subsequently displayed. As an example, the change determination unit 236 performs a change determination process by performing a content luminance comparison process.

Specifically, the change determination unit 236 compares the luminance of the content displayed on the display device 20 with the luminance of the content to be subsequently displayed. When a luminance difference is less than a prescribed threshold value, the change determination unit 236 determines to change the display mode of the display device 20. The difference is a difference between the luminance of a last frame to be displayed on the display device 20 among frames constituting the content displayed on the display device 20 and the luminance of a first frame to be displayed on the display device 20 among frames constituting the content to be subsequently displayed. For example, the prescribed threshold value is set as a minimum value at which a person can perceive that the luminance has changed when the content is switched from the content displayed on the display device 20 to the content to be subsequently displayed.

On the other hand, when the luminance difference is greater than or equal to the prescribed threshold value, the change determination unit 236 determines not to change the display mode of the display device 20. This is because, when the luminance difference is greater than or equal to the prescribed threshold value, a person can perceive the change in luminance when the content has been switched even if the content is switched without changing the luminance.

Also, the change determination unit 236 may determine whether or not to change the display mode of the display device 20 on the basis of whether the content displayed on the display device 20 and the content to be subsequently displayed are still images or moving images.

Specifically, when the content displayed on the display device 20 is a still image and the content to be subsequently displayed is a still image or when the content displayed on the display device 20 is a moving image and the content to be subsequently displayed is a moving image, the change determination unit 236 determines to change the display mode of the display device 20. When an image file format is the same between before and after switching of content, the occurrence of a significant change in the display between before and after switching of content is difficult. Thus, a person can easily perceive the change in the display when the content is switched by changing the display mode and switching the content.

On the other hand, when the content displayed on the display device 20 is a still image and the content to be subsequently displayed is a moving image or when the content displayed on the display device 20 is a moving image and the content to be subsequently displayed is a still image, the change determination unit 236 determines not to change the display mode of the display device 20. When an image file format is different between before and after switching of content, the occurrence of a significant change in the display between before and after switching of content is easy. Therefore, even if the content is switched without changing the display mode, a person can easily perceive the change in the display when the content is switched.

(3-7) Display Mode Change Unit 237

The display mode change unit 237 has a function of changing the display mode of the display device 20. For example, the display mode change unit 237 changes the display mode of the display device 20 by changing the luminance when content is displayed. Specifically, the display mode change unit 237 changes the luminance so that the difference between the luminance before the change and the luminance after the change is greater than or equal to a prescribed threshold value. More specifically, the display mode change unit 237 changes the display mode of the display device 20 by changing the luminance of the content displayed on the display device 20 so that the difference between the luminance of the content displayed on the display device 20 and the luminance of the content to be subsequently displayed is greater than or equal to the prescribed threshold value. At this time, the display mode change unit 237 changes only the luminance of the content displayed on the display device 20 without changing the luminance of the content to be subsequently displayed using the luminance of the content to be subsequently displayed as a reference.

As an example, the display mode change unit 237 gradually changes the luminance of the currently displayed content so that the luminance is opposite to the luminance of the first frame of the content to be subsequently displayed. Specifically, when the luminance of the first frame of the content to be subsequently displayed is high (bright), the display mode change unit 237 makes a change for gradually lowering (darkening) the luminance of the currently displayed content. On the other hand, when the luminance of the first frame of the content to be subsequently displayed is decreased (darkened), the display mode change unit 237 makes a change for gradually increasing (brightening) the luminance of the currently displayed content.

In this way, the display mode change unit 237 changes the luminance of the content before switching so that a person whose peripheral visual field includes the display device 20 can perceive a change in luminance between the content before switching and the content after switching. When a person perceives the change in luminance in the display device 20 with a peripheral visual field in a state in which he or she does not consciously look at the display device 20, attention is paid to the display device 20. Consequently, the display device 20 can guide a visual line of a person whose peripheral visual field includes the display device 20 in a direction in which the person has perceived the change in luminance in the peripheral visual field. Thereby, the display device 20 can allow the person to watch content displayed by the display device 20 by guiding the visual line of the person toward the display device 20 and attracting attention to the display device 20 in a state in which the person is not consciously looking at the display device 20, but the display device 20 is unconsciously seen.

Also, the luminance changed by the display mode change unit 237 may be the luminance of the content itself or the luminance of the display screen 21 on which the content may be displayed.

(4) Image Output Unit 240

The image output unit 240 has a function of outputting an image. For example, the image output unit 240 displays content on the display screen 21 of the display device 20. When the display mode of the display device 20 is changed by the display mode change unit 237, the image output unit 240 displays the content after the change in the display mode on the display screen 21.

Also, the image output unit 240 plays content to be displayed next to the currently displayed content from the beginning and displays the content on the display screen 21. Thereby, the image output unit 240 can allow a target person to watch the content desired to be watched from the beginning.

Also, when the content to be subsequently displayed is displayed on the display device 20, the image output unit 240 may display the content to be subsequently displayed on the display device 20 even if playback of the content displayed on the display device 20 is in progress. Thereby, the displayed content is suddenly switched in the display screen 21 of the display device 20. That is, the image displayed on the display device 20 significantly changes between before and after the content is switched. Thereby, a person whose peripheral visual field includes the display device 20 perceives that the content displayed on the display device 20 has significantly changed in the peripheral visual field without consciously looking at the display device 20 and pays attention to the display device 20. Consequently, the display device 20 can guide the visual line of a person whose peripheral visual field includes the display device 20 in a direction in which the person perceives that the content has changed significantly in the peripheral visual field. Thereby, the display device 20 can allow the person to watch content displayed by the display device 20 by guiding the visual line of the person in a state in which the person is not consciously looking at the display device 20 toward the display device 20 and attracting attention to the display device 20, but the display device 20 is unconsciously seen.

<1-3. Processing Flow>

Figure 4:
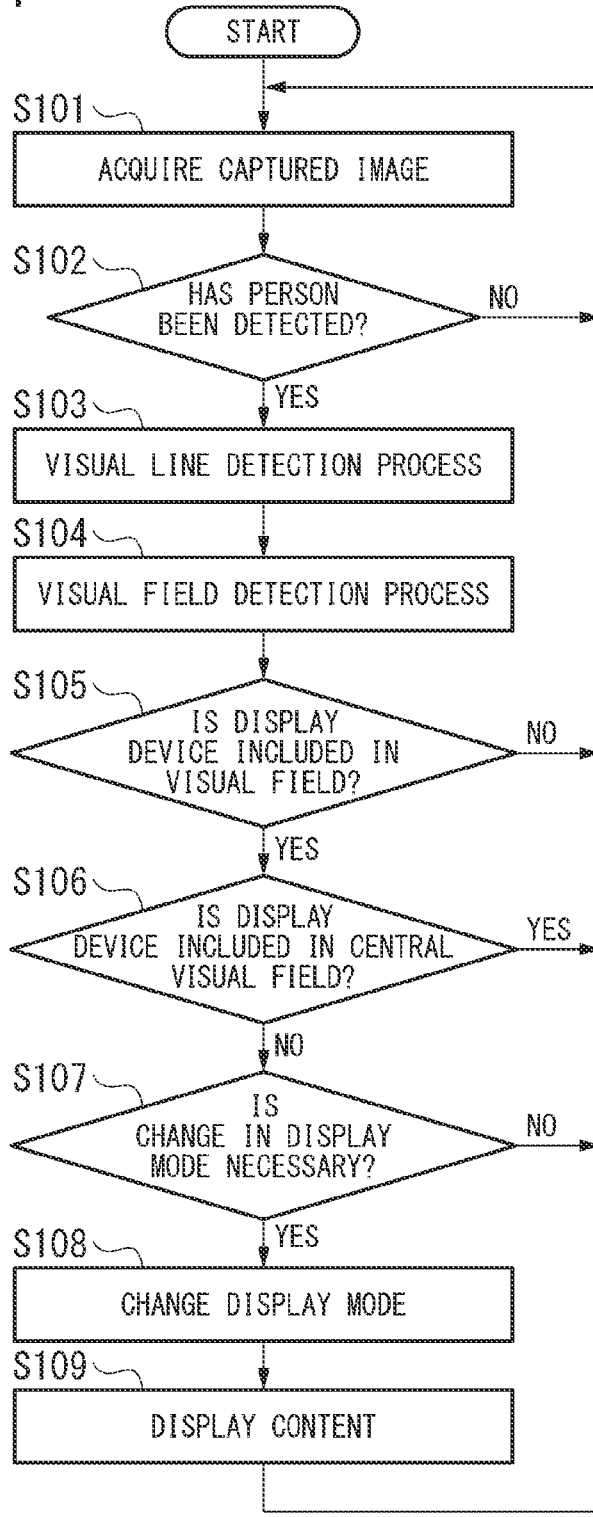
FIG. 4 is a flowchart showing an example of a flow of a process of the display device according to the first embodiment.

As described above, the example of the functional configuration of the display device 20 according to the first embodiment has been described. Next, an example of a flow of a process of the display device 20 according to the first embodiment will be described with reference to FIG. 4. FIG. 4 is a flowchart showing the example of the flow of the process of the display device 20 according to the first embodiment.

As shown in FIG. 4, first, the image input unit 210 acquires an image captured from the imaging device 10 and inputs the acquired image to the control unit 230 (step S101).

Subsequently, the person detection unit 231 performs a person detection process to confirm whether or not a person has been detected (step S102). The person detection unit 231 detects the person included in the captured image according to an image recognition process for the captured image input from the image input unit 210. When the person has been detected (step S102/YES), the display device 20 moves the process to step S103. On the other hand, when the person has not been detected (step S102/NO), the display device 20 iterates the process from step S101.

When the process moves to step S103, the visual line detection unit 232 performs a visual line detection process (step S103). The visual line detection unit 232 detects a visual line of the person detected from the image captured by the person detection unit 231.

Subsequently, the visual field detection unit 233 performs a visual field detection process (step S104). The visual field detection unit 233 detects the visual field, a central visual field, and a peripheral visual field of the person from an angle of a known visual field range and an angle of a known central visual field range using a direction of the visual line of the person detected by the visual line detection unit 232 as a reference.

Subsequently, the visual field determination unit 234 performs a visual field determination process to determine whether or not the display device 20 is included in the visual field of the person (step S105). When the display device 20 is included in the visual field of the person (step S105/YES), the display device 20 moves the process to step S106. On the other hand, when the display device 20 is not included in the visual field of the person (step S105/NO), the display device 20 iterates the process from step S101.

When the process moves to step S106, the central visual field determination unit 235 performs a central visual field determination process to determine whether or not the display device 20 is included in the central visual field of the person (step S106). When the display device 20 is included in the central visual field of the person (step S106/YES), the display device 20 iterates the process from step S101. On the other hand, when the display device 20 is not included in the central visual field of the person (step S106/NO), the display device 20 moves the process to step S107.

When the process has moved to step S107, the change determination unit 236 performs the change determination process and determines whether or not to change the display mode of the display device 20 (step S107). When it is determined that it is necessary to change the display mode of the display device 20 (step S107/YES), the display device 20 moves the process to step S108. On the other hand, when it is determined that it is not necessary to change the display mode of the display device 20 (step S107/NO), the display device 20 iterates the process from step S101.

When the process has moved to step S108, the display mode change unit 237 changes the display mode of the display device 20 (step S108).

Subsequently, the image output unit 240 displays the content on the display screen 21 (step S109). After the content is displayed, the display device 20 iterates the process from step S101.

As described above, the display device 20 according to the first embodiment includes the visual field determination unit 234 configured to determine whether or not the display device 20 is included in a visual field of a person included in a captured image; the central visual field determination unit 235 configured to determine whether or not the display device 20 is included in a central visual field within the visual field; and the change determination unit 236 configured to determine whether or not to temporarily change a display mode of the display device 20 displaying content before the content is switched from content (first content) displayed on the display device 20 to content (second content) to be subsequently displayed when it is determined that the display device 20 is included in the visual field but is not included in the central visual field.

With such a configuration, the display device 20 according to the first embodiment changes the display mode of the display device 20 as necessary when the display device 20 is included in the peripheral visual field of the detected person. When the display mode of the display device 20 is changed in the peripheral visual field of the person, the display device 20 can allow the person to perceive that something has changed in the display device 20 within a range where attention is not paid to the display device 20 and the display device 20 can be seen and can direct (guide) the visual line of the person toward the display device 20. Thereby, the display device 20 can allow a person who has not paid attention to the display device 20 to pay attention to the display device 20 and watch the content.

Consequently, the display device 20 according to the first embodiment can reduce the loss of an opportunity to watch content.

2. Second Embodiment

The first embodiment has been described above. Next, a second embodiment will be described. Although an example in which the number of detection target persons is one has been described in the first embodiment, the present invention is not limited to this example. In the second embodiment, an example in which there are a plurality of detection target persons will be described. Hereinafter, description identical to that of the first embodiment will be omitted as appropriate.

<2-1. Outline of Display System>

Figure 5:
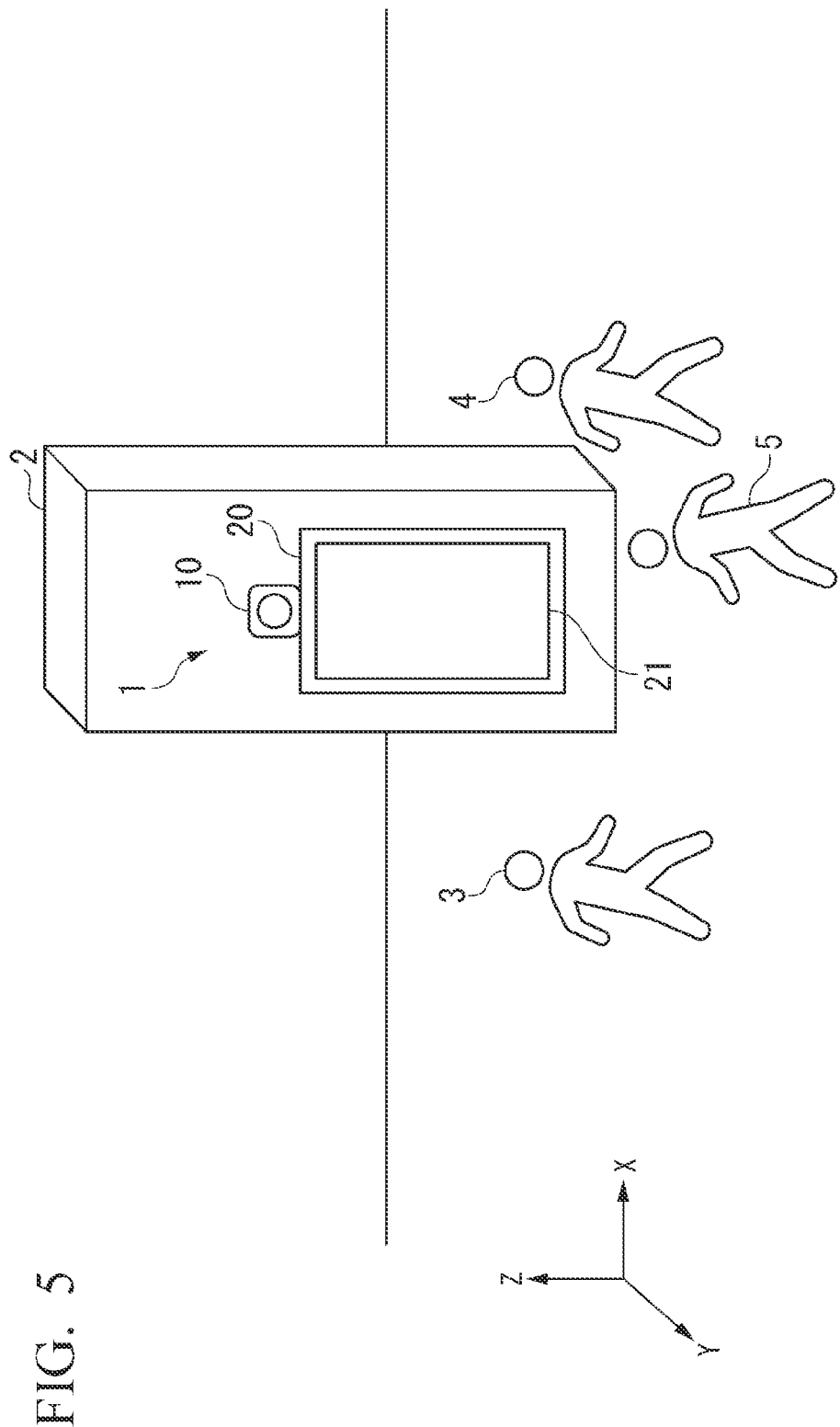
FIG. 5 is a diagram showing an outline of a display system according to a second embodiment.

An outline of the display system according to the second embodiment will be described with reference to FIG. 5. FIG. 5 is a diagram showing the outline of the display system 1 according to the second embodiment. As shown in FIG. 5, the display system 1 according to the second embodiment includes an imaging device 10 and a display device 20 like the display system 1 according to the first embodiment.

Also, because the imaging device 10 and the display device 20 according to the second embodiment are devices similar to the imaging device 10 and the display device 20 according to the first embodiment described with reference to FIG. 1, redundant description thereof will be omitted hereinafter.

The imaging device 10 according to the second embodiment captures an image (a still image or a moving image) including a plurality of persons when the plurality of persons located near the display device 20 are within a range where an imaging process of the imaging device 10 can be performed. For example, in the case of the example shown in FIG. 5, the imaging device 10 captures an image including a person 3, a person 4, and a person 5.

<2-2. Functional Configuration of Display Device>

As described above, the outline of the display system 1 according to the second embodiment has been described. Next, a functional configuration of the display device 20 according to the second embodiment will be described.

Because the functional configuration of the display device 20 according to the second embodiment is similar to the functional configuration of the display device 20 according to the first embodiment described with reference to FIG. 2, redundant description thereof will be omitted hereinafter.

The display device 20 according to the second embodiment includes an image input unit 210, a storage unit 220, a control unit 230, and an image output unit 240 like the display device 20 according to the first embodiment.

(1) Image Input Unit 210

Because a function of the image input unit 210 according to the second embodiment is similar to that of the image input unit 210 according to the first embodiment, redundant description thereof will be omitted.

(2) Storage Unit 220

Because a function of the storage unit 220 according to the second embodiment is similar to that of the storage unit 220 according to the first embodiment, redundant description thereof will be omitted.

The storage unit 220 according to the second embodiment includes a content storage unit 221 and a video memory unit 222 like the storage unit 220 according to the first embodiment.

(2-1) Content Storage Unit 221

Because a function of the content storage unit 221 according to the second embodiment is similar to that of the content storage unit 221 according to the first embodiment, redundant description thereof will be omitted.

(2-2) Video Memory Unit 222

Because the function of the video memory unit 222 according to the second embodiment is similar to that of the video memory unit 222 according to the first embodiment, redundant description thereof will be omitted.

(3) Control Unit 230

Because a function of the control unit 230 according to the second embodiment is similar to that of the control unit 230 according to the first embodiment, redundant description thereof will be omitted.

The control unit 230 according to the second embodiment includes a person detection unit 231, a visual line detection unit 232, a visual field detection unit 233, a visual field determination unit 234, a central visual field determination unit 235, a change determination unit 236, and a display mode change unit 237 like the control unit 230 according to the first embodiment.

(3-1) Person Detection Unit 231

Because a function of the person detection unit 231 according to the second embodiment is similar to that of the person detection unit 231 according to the first embodiment, redundant description thereof will be omitted.

The person detection unit 231 according to the second embodiment detects a plurality of persons (for example, the person 3, the person 4, and the person 5) from a captured image.

(3-2) Visual Line Detection Unit 232

Because a function of the visual line detection unit 232 according to the second embodiment is similar to that of the visual line detection unit 232 according to the first embodiment, redundant description thereof will be omitted.

The visual line detection unit 232 according to the second embodiment performs a visual line detection process for each of a plurality of persons (for example, the person 3, the person 4, and the person 5) and detects a visual line of each person.

(3-3) Visual Field Detection Unit 233

Because a function of the visual field detection unit 233 according to the second embodiment is similar to that of the visual field detection unit 233 according to the first embodiment, redundant description thereof will be omitted.

The visual field detection unit 233 according to the second embodiment performs a visual field detection process for each of the plurality of persons (for example, the person 3, the person 4, and the person 5) and detects a visual field of each person.

(3-4) Visual Field Determination Unit 234

Because a function of the visual field determination unit 234 according to the second embodiment is similar to that of the visual field determination unit 234 according to the first embodiment, redundant description thereof will be omitted.

The visual field determination unit 234 according to the second embodiment performs a visual field determination process for each of the plurality of persons (for example, the person 3, the person 4, and the person 5).

(3-5) Central Visual Field Determination Unit 235

Because a function of the central visual field determination unit 235 according to the second embodiment is similar to that of the central visual field determination unit 235 according to the first embodiment, redundant description thereof will be omitted.

The central visual field determination unit 235 according to the second embodiment performs the central visual field determination process when the visual field determination unit 234 determines that there is at least one person whose visual field includes the display device 20 in the visual field determination process. When there is a plurality of persons whose visual fields include the display device 20, the central visual field determination unit 235 performs a central visual field determination process for each person.

Here, the visual fields of the person 4 and the person 5 will be described with reference to FIGS. 6 and 7. Because the visual field of the person 3 is the same as the visual field described with reference to FIG. 3, redundant description thereof will be omitted.

Figure 6:
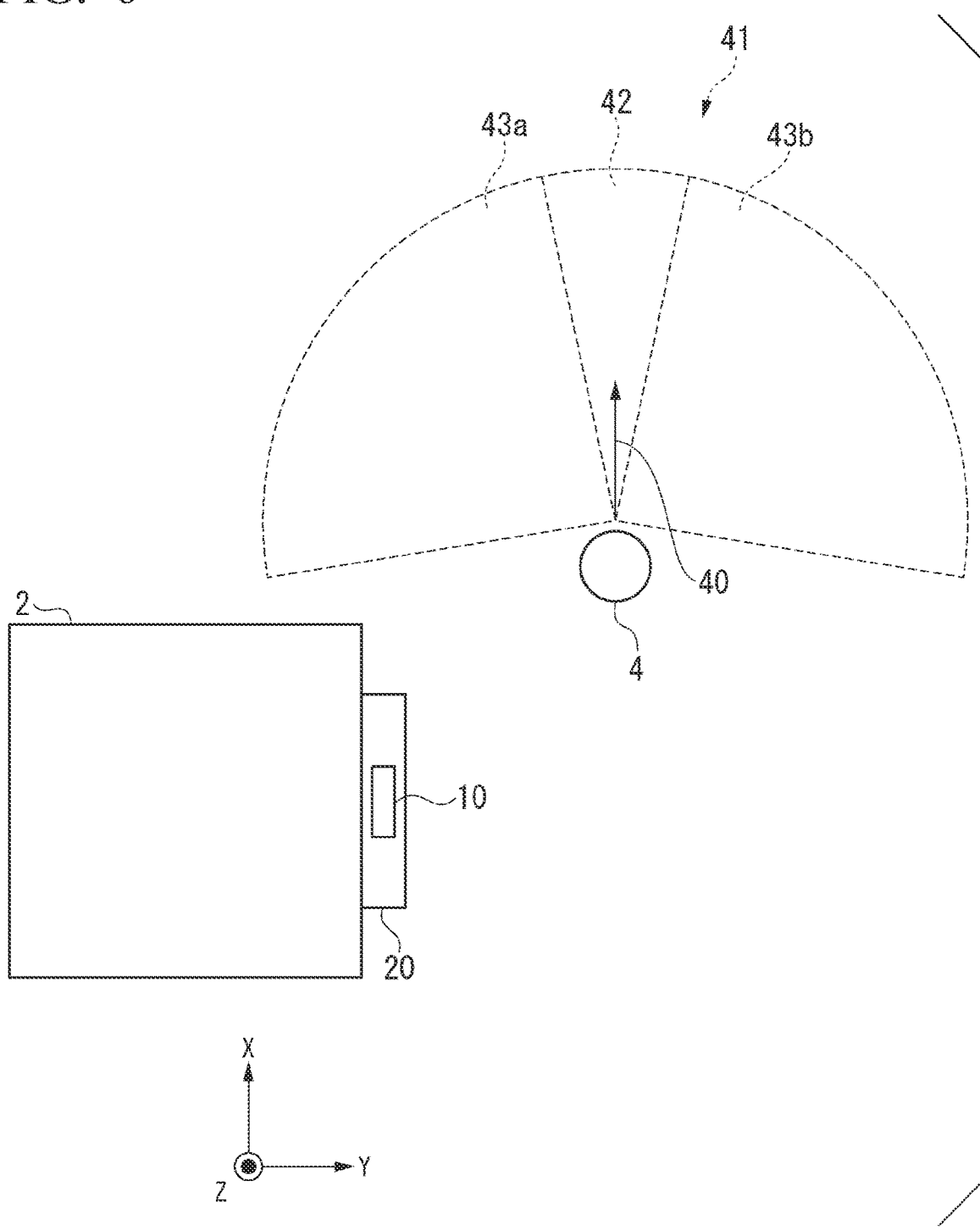
FIG. 6 is a diagram showing an example of a visual field of a person according to the second embodiment.

FIG. 6 is a diagram showing an example of the visual field of the person 4 according to the second embodiment. In FIG. 6, a view of the display system of FIG. 5 seen from above the head of the person 4 (the positive direction of the Z-axis) is shown.

In FIG. 6, an arrow 40 indicates a direction of the visual line of the person 4. The visual line detection unit 232 detects a direction of the visual line of the person 4 indicated by the arrow 40 from the captured image.

The fan-shaped region 41 indicated by a dashed line indicates the visual field of the person 4. The visual field of the person 4 indicated by the region 41 is detected by the visual field detection unit 233.

The region 41 includes a region 42, a region 43a, and a region 43b. The region 42 indicates a central visual field of the person 4. The regions 43a and 43b indicate the peripheral visual fields of the person 4. The central visual field indicated by the region 42 and the peripheral visual fields indicated by the region 43a and the region 43b are detected by the visual field detection unit 233.

In the example shown in FIG. 6, the display device 20 is not included in the region 41 which is the visual field of the person 4. Consequently, the visual field determination unit 234 determines that the display device 20 is not included in the visual field of the person 4. Thus, the central visual field determination unit 235 does not perform the central visual field determination process for the person 4.

Figure 7:
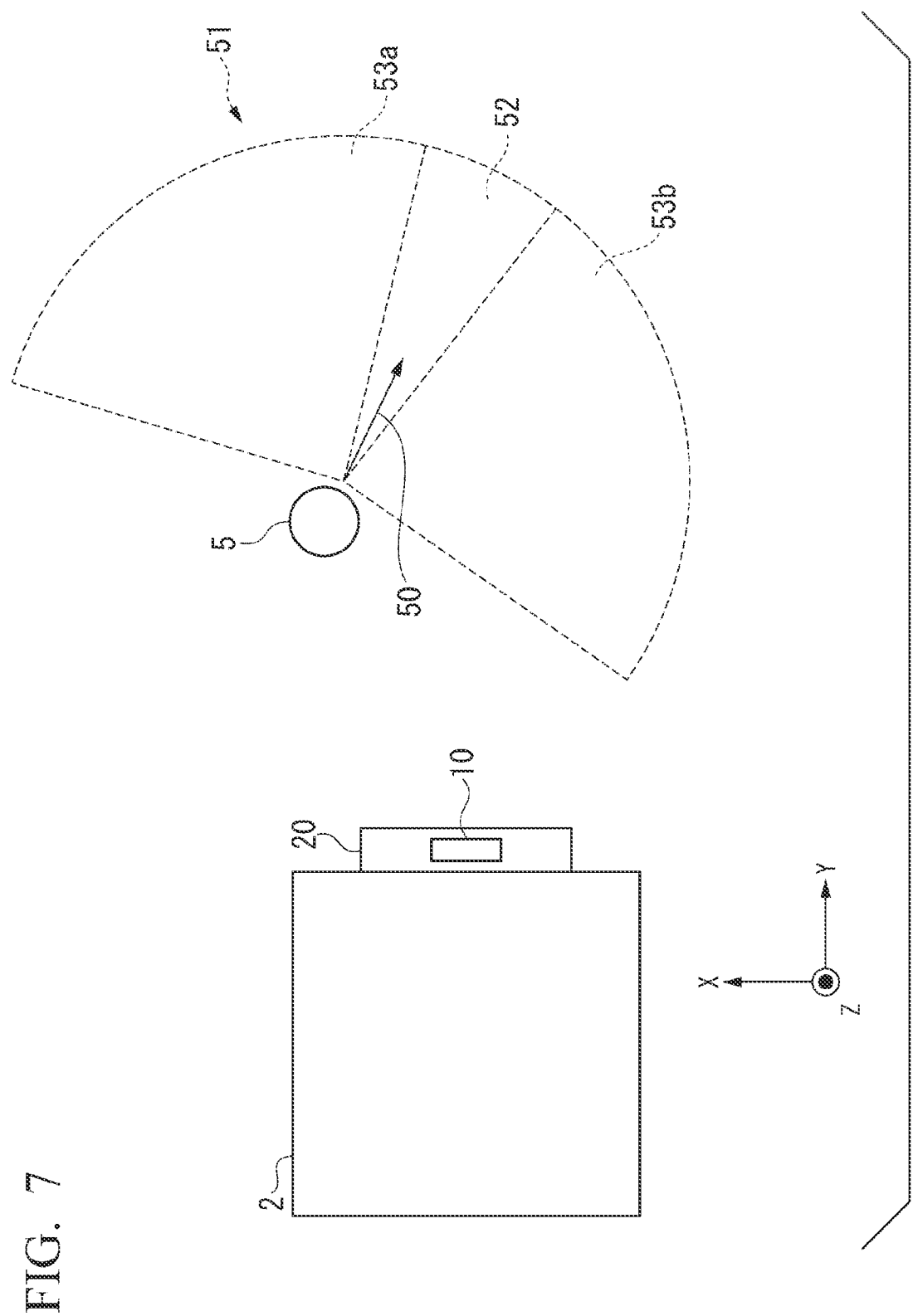
FIG. 7 is a diagram showing an example of a visual field of a person according to the second embodiment.

FIG. 7 is a diagram showing an example of the visual field of the person 5 according to the second embodiment. In FIG. 7, a view of the display system of FIG. 5 seen from above the head of the person 5 (the positive direction of the Z-axis) is shown.

In FIG. 7, an arrow 50 indicates a direction of the visual line of the person 5. The visual line detection unit 232 detects the direction of the visual line of the person 5 indicated by the arrow 50 from a captured image.

The fan-shaped region 51 indicated by a dashed line indicates the visual field of the person 5. The visual field of the person 5 indicated by the region 51 is detected by the visual field detection unit 233.

The region 51 includes a region 52, a region 53a, and a region 53b. The region 52 indicates a central visual field of the person 5. The regions 53a and 53b indicate peripheral visual fields of the person 5. The central visual field indicated by the region 52 and the peripheral visual fields indicated by the region 53a and the region 53b are detected by the visual field detection unit 233.

In the example shown in FIG. 7, the display device 20 is not included in the region 51 that is the visual field of the person 5. Consequently, the visual field determination unit 234 determines that the display device 20 is not included in the visual field of the person 5. Thus, the central visual field determination unit 235 does not perform the central visual field determination process for the person 5.

(3-6) Change Determination Unit 236

Because a function of the change determination unit 236 according to the second embodiment is similar to that of the change determination unit 236 according to the first embodiment, redundant description thereof will be omitted.

The change determination unit 236 according to the second embodiment performs the change determination process when it is determined that there is no person whose central visual field includes the display device 20 in the central visual field determination process of the central visual field determination unit 235. When there is a plurality of persons whose central visual field includes the display device 20, the change determination unit 236 may perform only one change determination process as a change determination process for all persons or may perform a change determination process for each person.

(3-7) Display Mode Change Unit 237

Because a function of the display mode change unit 237 according to the second embodiment is similar to that of the display mode change unit 237 according to the first embodiment, redundant description thereof will be omitted.

(4) Image Output Unit 240

Because a function of the image output unit 240 according to the second embodiment is similar to that of the image output unit 240 according to the first embodiment, redundant description thereof will be omitted.

<2-3. Processing Flow>

Figure 8:
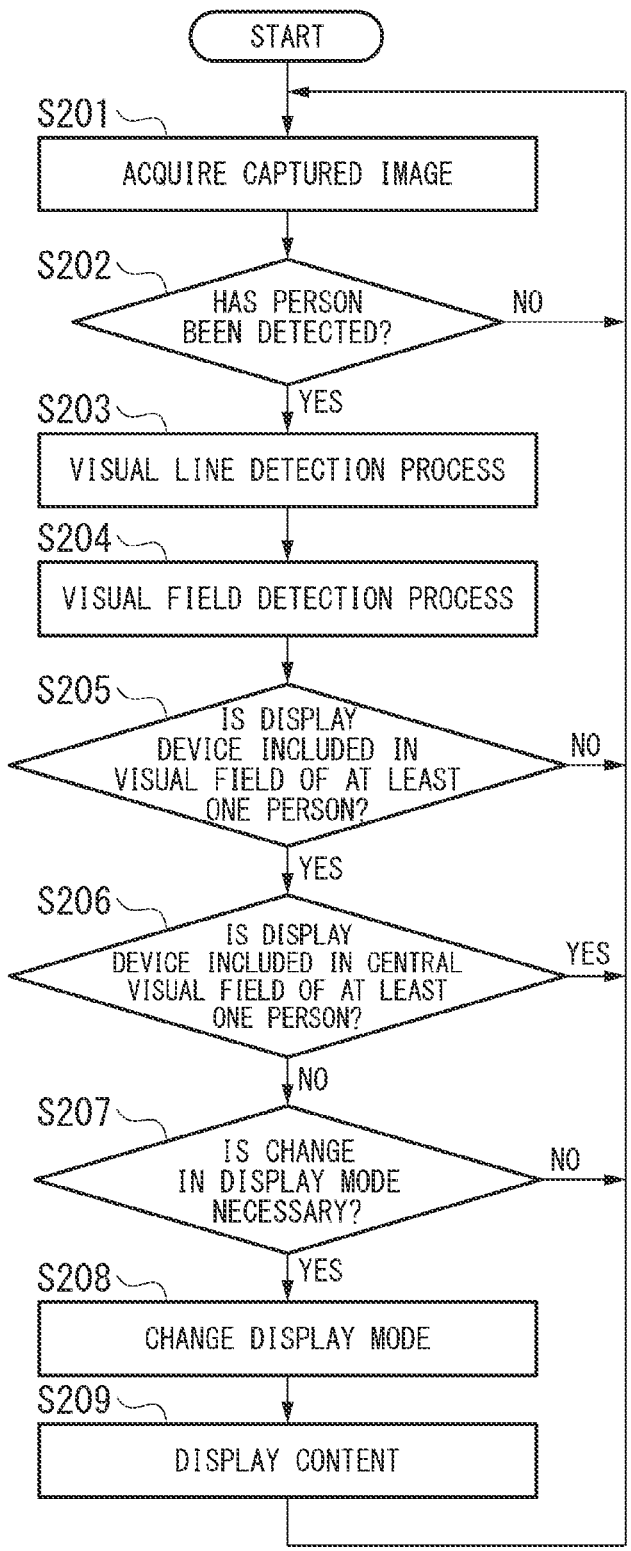
FIG. 8 is a flowchart showing an example of a flow of a process of a display device according to the second embodiment.

As described above, an example of the functional configuration of the display device 20 according to the second embodiment has been described. Next, an example of a flow of a process of the display device 20 according to the second embodiment will be described with reference to FIG. 8. FIG. 8 is a flowchart showing an example of a flow of a process of the display device 20 according to the second embodiment.

Because the processing of steps S201 to S204 shown in FIG. 8 is similar to the processing of steps S101 to S104 described with reference to FIG. 4, redundant description thereof will be omitted.

After step S204, the visual field determination unit 234 performs a visual field determination process to determine whether or not the display device 20 is included in a visual field of at least one person (step S205). When the display device 20 is included in the visual field of at least one person (step S205/YES), the display device 20 moves the process to step S206. On the other hand, when the display device 20 is not included in the visual field of at least one person (step S205/NO), the display device 20 iterates the process from step S201.

When the process moves to step S206, the central visual field determination unit 235 performs a central visual field determination process to determine whether or not the display device 20 is included in the central visual field of at least one person (step S206). When the display device 20 is included in the central visual field of at least one person (step S206/YES), the display device 20 iterates the process from step S201. On the other hand, when the display device 20 is not included in the central visual field of at least one person (step S206/NO), the display device 20 moves the process to step S207.

Because the processing of steps S207 to S209 shown in FIG. 8 is similar to the processing of steps S107 to S109 described with reference to FIG. 4, redundant description thereof will be omitted.

As described above, the display device 20 according to the second embodiment includes the visual field determination unit 234 configured to determine whether or not the display device 20 is included in visual fields of a plurality of persons included in a captured image; the central visual field determination unit 235 configured to determine whether or not the display device 20 is included in a central visual field within the visual field of at least one person; and the change determination unit 236 configured to determine whether or not to change a display mode of the display device 20 before content is switched from content displayed on the display device 20 to content to be subsequently displayed when it is determined that the display device 20 is included in the visual field of at least one person but there is no person whose central visual field includes the display device 20.

With such a configuration, the display device 20 according to the second embodiment changes the display mode of the display device 20 as necessary when there is no person whose central visual field includes the display device 20 among a plurality of detected persons and the display device 20 is included in the peripheral visual field of at least one person. When the display mode of the display device 20 is changed in the peripheral visual field of the person, the display device 20 can allow the person to perceive that something has changed in the display device 20 within a range where attention is not paid to the display device 20 and the display device 20 can be seen and can direct (guide) the visual line of the person toward the display device 20. Thereby, the display device 20 can allow a person who has not paid attention to the display device 20 to pay attention to the display device 20 and watch the content.

Consequently, the display device 20 according to the second embodiment can reduce the loss of an opportunity to watch content. The display device 20 according to the second embodiment does not change the display mode of the display device 20 when there is at least one person whose central visual field includes the display device 20. This is because there is at least one person watching the currently displayed content.

Although the first embodiment and the second embodiment have been described in detail with reference to FIGS. 1 to 8 as described above, the specific configuration is not limited to those described above and various design changes can be made without departing from the spirit and scope of the present invention.

Figure 9:
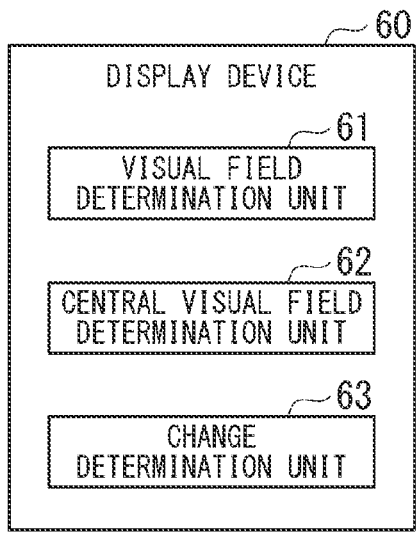
FIG. 9 is a block diagram showing a display device having another functional configuration according to the first embodiment and the second embodiment.

Further, display devices having other functional configurations according to the first embodiment and the second embodiment will be described with reference to FIG. 9. FIG. 9 is a block diagram showing a display device 60 having another functional configuration according to the first embodiment and the second embodiment.

As shown in FIG. 9, the display device 60 includes a visual field determination unit 61, a central visual field determination unit 62, and a change determination unit 63.

The visual field determination unit 61 determines whether or not the display device 60 is included in the visual field of a person included in the image captured by the imaging device for imaging a region around the display device 60 that displays content.

The central visual field determination unit 62 determines whether or not the display device 60 is included in the central visual field within the visual field.

When it is determined that the display device 60 is included in the visual field but is not included in the central visual field, the change determination unit 63 determines whether or not to temporarily change the display mode of the display device 60 displaying the first content before content is switched from the first content displayed on the display device 60 to the second content to be subsequently displayed.

3. Third Embodiment

The second embodiment has been described above. Next, a third embodiment will be described. Although the example in which the display device 20 directs the visual line of a person included in the peripheral visual field toward the display device 20 by changing the display mode of the display device 20 has been described in the first embodiment and the second embodiment, the present invention is not limited to this example. In the third embodiment, an example in which a display device 20a directs the visual line of a person included in the peripheral visual field toward the display device 20a by switching the content to be displayed on the display device 20a will be described. Hereinafter, description identical to those of the first embodiment and the second embodiment will be omitted as appropriate.

<3-1. Outline of Display System>

An outline of the display system according to the third embodiment will be described. Because the outline of the display system according to the third embodiment is similar to the outline of the display system 1 according to the first embodiment described with reference to FIG. 1, redundant description thereof will be omitted.

<3-2. Functional Configuration of Display Device>

Figure 10:
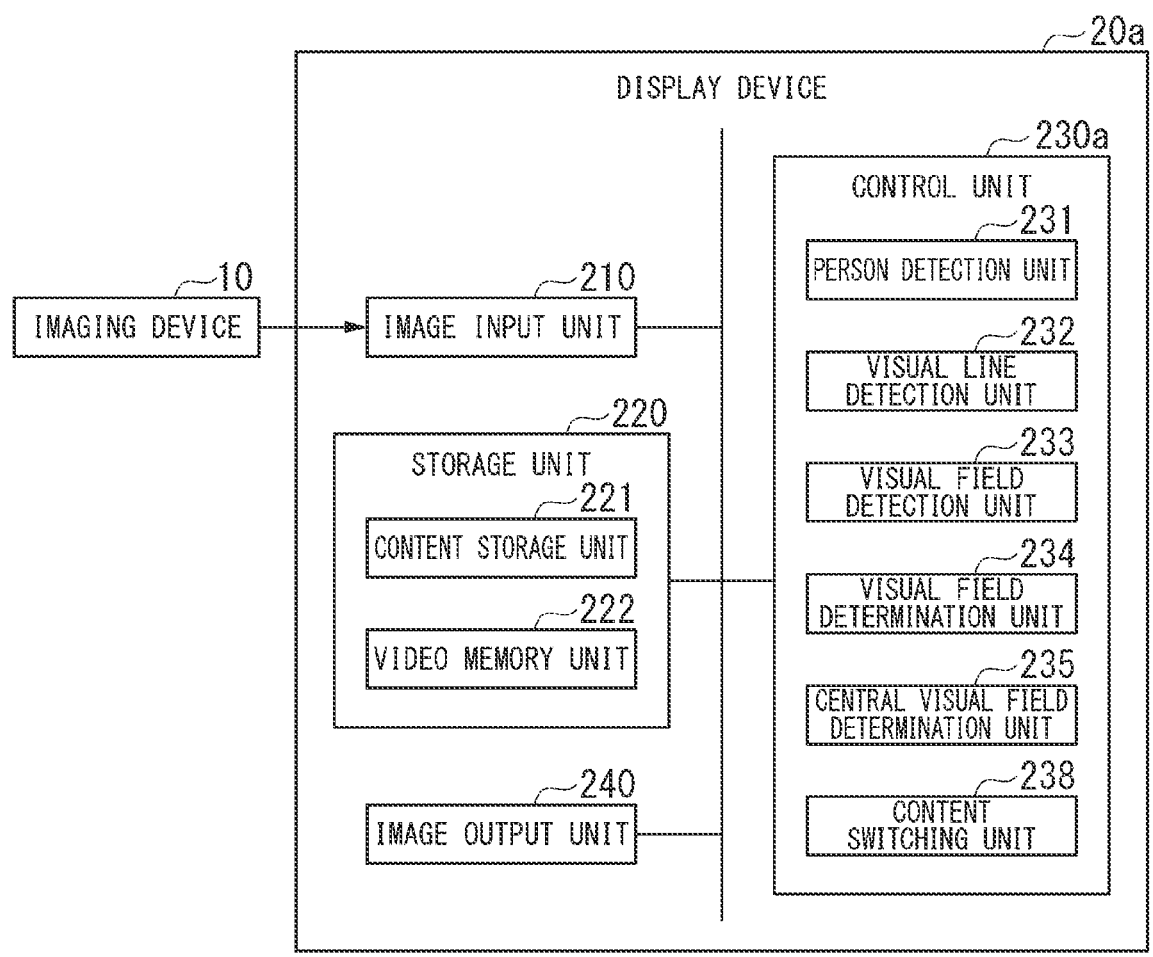
FIG. 10 is a block diagram showing an example of a functional configuration of a display device according to a third embodiment.

The outline of the display system according to the third embodiment has been described above. Next, a functional configuration of the display device according to the third embodiment will be described with reference to FIG. 10. FIG. 10 is a block diagram showing an example of a functional configuration of the display device 20a according to the third embodiment.

The functional configuration of the display device 20a according to the third embodiment is partially different from that of the display device 20 according to the first embodiment described with reference to FIG. 2. Hereinafter, redundant description thereof will be omitted.

As shown in FIG. 10, the display device 20a according to the third embodiment includes an image input unit 210, a storage unit 220, a control unit 230a, and an image output unit 240.

(1) Image Input Unit 210

Because a function of the image input unit 210 according to the third embodiment is similar to that of the image input unit 210 according to the first embodiment, redundant description thereof will be omitted.

(2) Storage Unit 220

Because a function of the storage unit 220 according to the third embodiment is similar to that of the storage unit 220 according to the first embodiment, redundant description thereof will be omitted.

The storage unit 220 according to the third embodiment includes a content storage unit 221 and a video memory unit 222 like the storage unit 220 according to the first embodiment.

(2-1) Content Storage Unit 221

Because a function of the content storage unit 221 according to the third embodiment is similar to that of the content storage unit 221 according to the first embodiment, redundant description thereof will be omitted.

(2-2) Video Memory Unit 222

Because a function of the video memory unit 222 according to the third embodiment is similar to that of the video memory unit 222 according to the first embodiment, redundant description thereof will be omitted.

(3) Control Unit 230a

The functions of the control unit 230a according to the third embodiment are partially different from those of the control unit 230 according to the first embodiment described with reference to FIG. 2.

As shown in FIG. 10, the control unit 230a according to the third embodiment includes a person detection unit 231, a visual line detection unit 232, a visual field detection unit 233, a visual field determination unit 234, a central visual field determination unit 235, and a content switching unit 238.

(3-1) Person Detection Unit 231

Because a function of the person detection unit 231 according to the third embodiment is similar to that of the person detection unit 231 according to the first embodiment, redundant description thereof will be omitted.

(3-2) Visual Line Detection Unit 232

Because a function of the visual line detection unit 232 according to the third embodiment is similar to that of the visual line detection unit 232 according to the first embodiment, redundant description thereof will be omitted.

(3-3) Visual Field Detection Unit 233

Because a function of the visual field detection unit 233 according to the third embodiment is similar to that of the visual field detection unit 233 according to the first embodiment, redundant description thereof will be omitted.

(3-4) Visual Field Determination Unit 234

Because a function of the visual field determination unit 234 according to the third embodiment is similar to that of the visual field determination unit 234 according to the first embodiment, redundant description thereof will be omitted.

(3-5) Central Visual Field Determination Unit 235

Because a function of the central visual field determination unit 235 according to the third embodiment is similar to that of the central visual field determination unit 235 according to the first embodiment, redundant description thereof will be omitted.

(3-6) Content Switching Unit 238

The content switching unit 238 has a function of switching the content to be displayed on the display device 20a. When the central visual field determination unit 235 determines that the display device 20a is included in the visual field but is not included in the central visual field, the content switching unit 238 switches the content to be displayed on the display device 20a. That is, the content switching unit 238 switches the content to be displayed on the display device 20a when the display device 20a is included in a peripheral visual field of a target person.

As an example, when content is displayed on the display device 20a, the content switching unit 238 switches the content from content displayed on the display device 20a to content (second content) to be subsequently displayed even if the playback of the content (first content) displayed on the display device 20a is in progress. Thereby, the content displayed on the display screen 21 of the display device 20a is suddenly switched. That is, the image displayed on the display device 20a significantly changes between before and after switching of the content. Thereby, a person whose peripheral visual field includes the display device 20a perceives that the content displayed on the display device 20a has significantly changed in the peripheral visual field without consciously looking at the display device 20a and pays attention to the display device 20a. Consequently, the display device 20a can guide the visual line of a person whose peripheral visual field includes the display device 20a in a direction in which the person perceives that the content has changed significantly in the peripheral visual field. Thereby, the display device 20a can allow the person to watch content displayed by the display device 20a by guiding the visual line of the person in a state in which the person is not consciously looking at the display device 20a, but the display device 20a is unconsciously seen toward the display device 20a and attracting attention to the display device 20a.

Also, the content switching unit 238 switches the content to the content to be subsequently displayed after the content displayed on the display device 20a is played to the end when it is determined that the display device 20a is included in the central visual field. The fact that the display device 20 is included in the central visual field indicates that a person is watching content displayed on the display device 20a. Thus, the content switching unit 238 can allow a person to watch the content before switching to the end by switching the content after the content displayed on the display device 20a is played to the end. Also, the content switching unit 238 can allow the person to continuously watch the content to be subsequently displayed.

Also, as an example, the content switching unit 238 may switch the content to a moving image when the content before switching is a still image and may switch the content to a still image when the content before switching is a moving image. When the content is switched from a still image to a moving image, movement in the content occurs suddenly. On the other hand, when the content is switched from a moving image to a still image, the movement in the content suddenly disappears.

By doing so, the content switching unit 238 can cause a change in the display state of the content between before and after the content is switched. Thereby, a person whose peripheral visual field includes the display device 20a perceives a change in the display state of the content in the display device 20a in the peripheral visual field without consciously looking at the display device 20a, and pays attention toward the display device 20a.

Also, as an example, the content switching unit 238 may cause a change in movement in details of the content. For example, movement is given when the object displayed in the content is stationary and movement is made stationary when the object is moving. Also, the content switching unit 238 may cause a change in movement to either the content before switching or the content after switching.

By doing so, the content switching unit 238 can cause a change in the display state of the content displayed on the display device 20a. Thereby, a person whose peripheral visual field includes the display device 20a perceives a change in the display state of the content in the display device 20a in the peripheral visual field without consciously looking at the display device 20a and pays attention toward the display device 20a.

(4) Image Output Unit 240

Because a function of the image output unit 240 according to the third embodiment is similar to that of the image output unit 240 according to the first embodiment, redundant description thereof will be omitted.

<3-3. Processing Flow>

Figure 11:
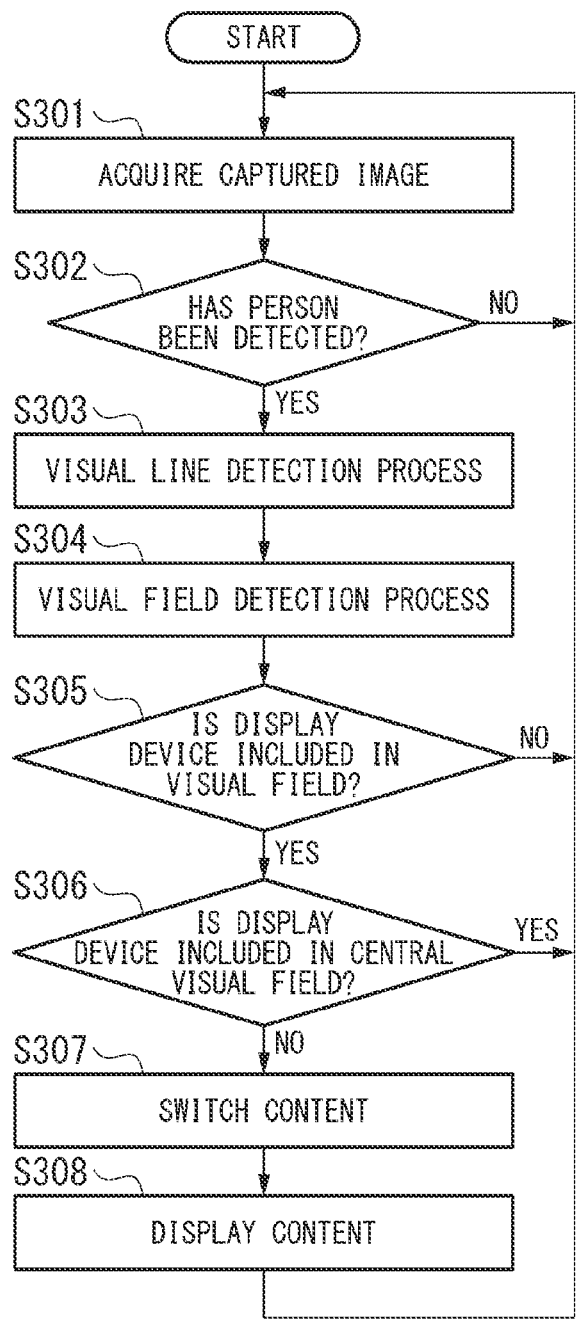
FIG. 11 is a flowchart showing an example of a flow of a process of the display device according to the third embodiment.

As described above, an example of the functional configuration of the display device 20a according to the third embodiment has been described. Next, an example of a flow of a process of the display device 20a according to the third embodiment will be described with reference to FIG. 11. FIG. 11 is a flowchart showing the example of the flow of the process in the display device 20a according to the third embodiment.

Because the processing of steps S301 to S306 shown in FIG. 11 is similar to the processing of steps S101 to S106 described with reference to FIG. 4, redundant description thereof will be omitted.

When it is determined that the display device 20 is not included in a central visual field of a person in step S306 (step S306/NO) and the process moves to step S307, the content switching unit 238 switches the content displayed on the display device 20a. For example, the content switching unit 238 switches content from the content displayed on the display device 20a to the content to be subsequently displayed even if the playback of the content displayed on the display device 20a is in progress.

Because the processing of step S308 shown in FIG. 11 is similar to the processing of step S109 described with reference to FIG. 4, redundant description thereof will be omitted.

As described above, the display device 20a according to the third embodiment includes the visual field determination unit 234 configured to determine whether or not the display device 20a is included in a visual field of a person included in a captured image; and the central visual field determination unit 235 configured to determine whether or not the display device 20a is included in a central visual field within the visual field, wherein the content is switched from content displayed on the display device 20a to content to be subsequently displayed even if the playback of the content displayed on the display device 20a is in progress when it is determined that the display device 20a is included in the visual field but is not included in the central visual field.

With such a configuration, the display device 20a according to the third embodiment changes the display of content as necessary when the display device 20a is included in the peripheral visual field of the detected person. When the display of content is switched in the peripheral visual field of the person, the display device 20*a* can allow the person to perceive that something has changed in the display device 20*a* within a range where attention is not paid to the display device 20*a* and the display device 20*a* can be seen and can direct (guide) the visual line of the person toward the display device 20*a*. Thereby, the display device 20*a* can allow a person who has not paid attention to the display device 20*a* to pay attention to the display device 20*a* and watch the content.

Consequently, the display device 20*a* according to the third embodiment can reduce the loss of an opportunity to watch content.

4. Fourth Embodiment

The third embodiment has been described above. Next, a fourth embodiment will be described. Although an example in which there is one detection target person has been described in the third embodiment, the present invention is not limited to this example. In the fourth embodiment, an example in which there are a plurality of detection target persons will be described. Hereinafter, description identical to those of the first to third embodiments will be omitted as appropriate.

<4-1. Outline of Display System>

An outline of the display system according to the fourth embodiment will be described. Because the outline of the display system according to the fourth embodiment is similar to that of the display system 1 according to the second embodiment described with reference to FIG. 5, redundant description thereof will be omitted.

<4-2. Functional Configuration of Display Device>

An outline of the display system 1 according to the fourth embodiment has been described above. Next, a functional configuration of the display device 20*a* according to the fourth embodiment will be described.

Because the functional configuration of the display device 20*a* according to the fourth embodiment is similar to that of the display device 20*a* according to the third embodiment described with reference to FIG. 10, redundant description thereof will be omitted.

The display device 20*a* according to the fourth embodiment includes an image input unit 210, a storage unit 220, a control unit 230*a*, and an image output unit 240 like the display device 20*a* according to the third embodiment.

(1) Image Input Unit 210

Because a function of the image input unit 210 according to the fourth embodiment is similar to that of the image input unit 210 according to the third embodiment, redundant description thereof will be omitted.

(2) Storage Unit 220

Because a function of the storage unit 220 according to the fourth embodiment is similar to that of the storage unit 220 according to the third embodiment, redundant description thereof will be omitted.

The storage unit 220 according to the fourth embodiment includes a content storage unit 221 and a video memory unit 222 like the storage unit 220 according to the third embodiment.

(2-1) Content Storage Unit 221

Because a function of the content storage unit 221 according to the fourth embodiment is similar to that of the content storage unit 221 according to the third embodiment, redundant description thereof will be omitted.

(2-2) Video Memory Unit 222

Because a function of the video memory unit 222 according to the fourth embodiment is similar to that of the video memory unit 222 according to the third embodiment, redundant description thereof will be omitted.

(3) Control Unit 230*a*

Because a function of the control unit 230*a* according to the fourth embodiment is similar to that of the control unit 230*a* according to the third embodiment, redundant description thereof will be omitted.

The control unit 230*a* according to the fourth embodiment includes a person detection unit 231, a visual line detection unit 232, a visual field detection unit 233, a visual field determination unit 234, a central visual field determination unit 235, and a content switching unit 238 like the control unit 230*a* according to the third embodiment.

(3-1) Person Detection Unit 231

Because a function of the person detection unit 231 according to the fourth embodiment is similar to that of the person detection unit 231 according to the third embodiment, redundant description thereof will be omitted.

The person detection unit 231 according to the fourth embodiment detects a plurality of persons (for example, a person 3, a person 4, and a person 5) from a captured image.

(3-2) Visual Line Detection Unit 232

Because a function of the visual line detection unit 232 according to the fourth embodiment is similar to that of the visual line detection unit 232 according to the third embodiment, redundant description thereof will be omitted.

The visual line detection unit 232 according to the fourth embodiment performs a visual line detection process for each of a plurality of persons (for example, the person 3, the person 4, and the person 5), and detects a visual line of each person.

(3-3) Visual Field Detection Unit 233

Because a function of the visual field detection unit 233 according to the fourth embodiment is similar to that of the visual field detection unit 233 according to the third embodiment, redundant description thereof will be omitted.

The visual field detection unit 233 according to the fourth embodiment performs a visual field detection process for each of a plurality of persons (for example, the person 3, the person 4, and the person 5) and detects a visual line of each person.

(3-4) Visual Field Determination Unit 234

Because a function of the visual field determination unit 234 according to the fourth embodiment is similar to that of the visual field determination unit 234 according to the third embodiment, redundant description thereof will be omitted.

The visual field determination unit 234 according to the fourth embodiment performs a visual field determination process for each of a plurality of persons (for example, the person 3, the person 4, and the person 5).

(3-5) Central Visual Field Determination Unit 235

Because a function of the central visual field determination unit 235 according to the fourth embodiment is similar to that of the central visual field determination unit 235 according to the third embodiment, redundant description thereof will be omitted.

The central visual field determination unit 235 according to the fourth embodiment performs a central visual field determination process when it is determined that there is at least one person whose visual field includes the display device 20*a* in the visual field determination process of the visual field determination unit 234. When there is a plurality of persons whose visual fields include the display device 20*a*, the central visual field determination unit 235 performs a central visual field determination process for each person.

(3-6) Content Switching Unit 238

Because a function of the content switching unit 238 according to the fourth embodiment is similar to that of the content switching unit 238 according to the third embodiment, redundant description thereof will be omitted.

The content switching unit 238 according to the fourth embodiment switches content when there is no person whose central visual field includes the display device 20a among persons whose visual fields include the display device 20a among the plurality of persons.

(4) Image Output Unit 240

Because a function of the image output unit 240 according to the fourth embodiment is similar to that of the image output unit 240 according to the third embodiment, redundant description thereof will be omitted.

<4-3. Processing Flow>

Figure 12:
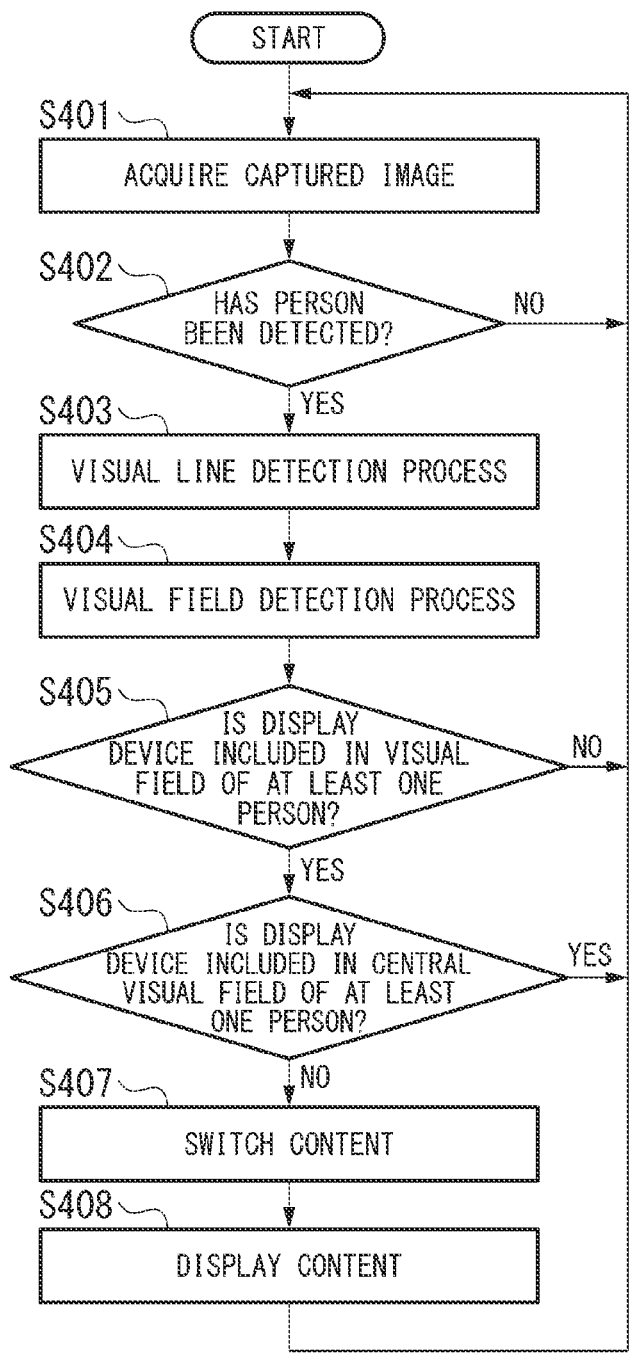
FIG. 12 is a flowchart showing an example of a flow of a process of a display device according to a fourth embodiment.

An example of the functional configuration of the display device 20a according to the fourth embodiment has been described above. Next, an example of a flow of a process of the display device 20a according to the fourth embodiment will be described with reference to FIG. 12. FIG. 12 is a flowchart showing an example of the flow of the process of the display device 20a according to the fourth embodiment.

Because the processing of steps S401 to S406 shown in FIG. 12 is similar to the processing of steps S201 to S206 described with reference to FIG. 8, redundant description thereof will be omitted.

When it is determined that the display device 20a is not included in the central visual field of at least one person in step S406 (step S406/NO) and the process moves to step S407, the content switching unit 238 switches the content displayed on the display device 20a. For example, the content switching unit 238 switches the content from the content displayed on the display device 20a to the content to be subsequently displayed even if the playback of the content displayed on the display device 20a is in progress.

Because the processing of step S408 shown in FIG. 12 is similar to the processing of step S209 described with reference to FIG. 8, redundant description thereof will be omitted.

As described above, the display device 20a according to the fourth embodiment includes the visual field determination unit 234 configured to determine whether or not the display device 20a is included in visual fields of a plurality of persons included in a captured image; the central visual field determination unit 235 configured to determine whether or not the display device 20a is included in a central visual field within the visual field of at least one person; and the content switching unit 238 configured to switch the content when there is no person whose central visual field includes the display device 20a among persons whose visual fields include the display device 20a among the plurality of persons.

With such a configuration, the display device 20a according to the fourth embodiment switches the content to be displayed when there is no person whose central visual field includes the display device 20a among a plurality of detected persons and the display device 20a is included in the peripheral visual field of at least one person. When the display of content is switched in the peripheral visual field of the person, the display device 20a can allow the person to perceive that something has changed in the display device 20a within a range where attention is not paid to the display device 20a, but the display device 20a can be seen and can direct (guide) the visual line of the person toward the display device 20a. Thereby, the display device 20a can allow a person who has not paid attention to the display device 20a to pay attention to the display device 20a and watch the content.

Consequently, the display device 20a according to the fourth embodiment can reduce the loss of an opportunity to watch content. Also, the display device 20a according to the fourth embodiment does not switch content when there is at least one person whose central visual field includes the display device 20a. This is because there is at least one person watching the currently displayed content.

Although the third embodiment and the fourth embodiment have been described above in detail with reference to FIGS. 10 to 12, specific configurations are not limited to the above-described embodiments and various design changes can be made without departing from the spirit and scope of the present invention.

Figure 13:
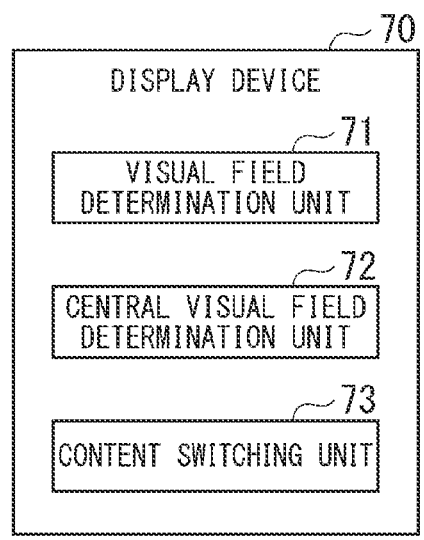
FIG. 13 is a block diagram showing a display device having another functional configuration according to the third embodiment and the fourth embodiment.

Further, display devices of other functional configurations according to the third embodiment and the fourth embodiment will be described with reference to FIG. 13. FIG. 13 is a block diagram showing a display device 70 of another functional configuration according to the third embodiment and the fourth embodiment.

As shown in FIG. 13, the display device 70 includes a visual field determination unit 71, a central visual field determination unit 72, and a content switching unit 73.

The visual field determination unit 71 determines whether or not the display device 70 is included in a visual field of a person included in the image captured by the imaging device that captures a region around the display device 70 for displaying content having a finite playback period of time as digital signage.

The central visual field determination unit 72 determines whether or not the display device 70 is included in a central visual field within the visual field.

When it is determined that the display device 70 is included in the visual field but is not included in the central visual field, the content switching unit 73 switches content from first content to second content to be subsequently displayed even if the playback of the first content displayed on the display device 70 is in progress.

5. Modified Examples

Embodiments of the present invention have been described above. Next, a modified example of the present invention will be described. The modified example to be described below may be applied to the embodiment of the present invention alone or may be applied to the embodiment of the present invention in combination. Also, the modified example may be applied instead of the configuration described in the embodiment of the present invention or may be additionally applied to the configuration described in the embodiment of the present invention.

Although an example in which a visual line and a visual field of a person are detected before the display mode of the display device is changed or before the content is switched has been described in each of the above-described embodiments, the present invention is not limited to this example.

For example, the display device of each of the above-described embodiments may also continue to detect the visual line and the visual field of the person after the visual line is directed toward the display device.

Thereby, the display device can easily determine whether or not a person has watched the content to the end (i.e., whether or not the person has watched the content with interest) in accordance with a change in the detected visual line or field.

The embodiments of the present invention have been described above. Also, all or some functions of the display devices 20, 20a, 60, and 70 (the display control device) according to the above-described embodiments may be implemented by a computer. In this case, the function is implemented by recording a program for implementing the functions on a computer-readable recording medium and causing a computer system to read and execute the program recorded on the recording medium. Also, the "computer system" used herein is assumed to include an operating system (OS) and hardware such as peripheral equipment. Also, the "computer-readable recording medium" refers to a flexible disk, a magneto-optical disc, a read-only memory (ROM), a portable medium such as a compact disc (CD)-ROM, or a storage device such as a hard disk embedded in the computer system. Furthermore, the "computer-readable recording medium" may include a computer-readable recording medium for dynamically holding the program for a short time period as in a communication line when the program is transmitted via a network such as the Internet or a communication circuit such as a telephone circuit and a computer-readable recording medium for holding the program for a given time period as in a volatile memory inside the computer system serving as a server or a client when the program is transmitted. Also, the above-described program may be a program for implementing some of the above-described functions. Furthermore, the above-described program may be a program capable of implementing the above-described function in combination with a program already recorded on the computer system or implementing the above-described function using a programmable logic device such as a field programmable gate array (FPGA).

Although embodiments of the present invention have been described in detail with reference to the drawings, specific configurations are not limited to those described above and various design changes and the like can be made without departing from the scope and spirit of the present invention.

REFERENCE SIGNS LIST

1 Display system
10 Imaging device
20, 20a, 60, 70 Display device
21 Display screen
210 Image input unit
220 Storage unit
221 Content storage unit
222 Video memory unit
230 Control unit
231 Person detection unit
232 Visual line detection unit
233 Visual field detection unit
234, 61,71 Visual field detection unit
235, 62, 72 Central visual field determination unit
236, 63 Change determination unit
237 Display mode change unit
238, 73 Content switching unit
30, 40, 50 Arrow (visual line)
31, 41, 51 Region (visual field)
32, 42, 52 Region (central visual field)
33a, 33b, 43a, 43b, 53a, 53b Region (peripheral visual field)

What is claimed is:
1. A display control device comprising:
one or more hardware-processors;
one or more memories that stores one or more programs that are executable by the one or more hardware-processors, to cause the one or more hardware-processors to perform a plurality of operations that comprises:
determining whether or not a display device for displaying content is included in a visual field of a person included in an image captured by an imaging device that images a region around the display device;
determining whether or not the display device is included in a central visual field within the visual field; and
determining whether or not to temporarily change a display mode of the display device displaying first content before the content is switched from the first content displayed on the display device to second content to be subsequently displayed when it is determined that the display device is included in the visual field but is not included in the central visual field.

2. The display control device according to claim 1, wherein determining whether or not to temporarily change the display mode comprises determining whether or not to change the display mode of the display device on the basis of a result of comparing the first content with the second content.

3. The display control device according to claim 2, wherein determining whether or not to temporarily change the display mode comprises changing the display mode of the display device when a difference between luminance of the first content and luminance of the second content is less than a prescribed threshold value.

4. The display control device according to claim 3, wherein the difference is a difference between luminance of a last frame displayed on the display device among frames constituting the first content and luminance of a first frame displayed on the display device among frames constituting the second content.

5. The display control device according to claim 1, further comprising:
changing the display mode of the display device by changing luminance of the first content so that a difference between the luminance of the first content and luminance of the second content is greater than or equal to a prescribed threshold value.

6. The display control device according to claim 5, wherein changing the display mode comprises changing only the luminance of the first content without changing the luminance of the second content using the luminance of the second content as a reference.

7. The display control device according to claim 1, wherein, when a plurality of persons are included in the image,
determining whether or not the display device for displaying content is included in the visual field of the person included in the image comprises determining whether or not the display device is included in the visual field of each person,
determining whether or not the display device is included in the central visual field comprises determining whether or not the display device is included in the central visual field of each person, and
determining whether or not to temporarily change the display mode comprises determining whether or not to change the display mode of the display device when there is no person whose central visual field includes the display device among persons whose visual fields include the display device among the plurality of persons.

8. The display control device according to claim 1, further comprising:
displaying the second content on the display device even if the playback of the first content is in progress when the second content is displayed on the display device.

9. The display control device according to claim 1, wherein the one or more hardware-processors are configured to perform the plurality of operations according to the one or more programs stored in the one or more memories.

10. The display device comprising the display control device according to claim 1.

11. A display control device comprising:
one or more hardware-processors;
one or more memories that stores one or more programs that are executable by the one or more hardware-processors, to cause the one or more hardware-processors to perform a plurality of operations that comprises:
determining whether or not a display device is included in a visual field of a person included in an image captured by an imaging device that images a region around the display device that displays content having a finite playback period of time as digital signage;
determining whether or not the display device is included in a central visual field within the visual field; and
switching the content from first content to second content to be subsequently displayed even if the playback of the first content displayed on the display device is in progress when it is determined that the display device is included in the visual field but is not included in the central visual field.

12. The display control device according to claim 11, wherein switching the content comprises switching the content to the second content after the first content is played to the end when it is determined that the display device is included in the central visual field.

13. The display control device according to claim 11, wherein switching the content comprises switching the content to a moving image when the content before switching is a still image and switches the content to a still image when the content before switching is a moving image.

14. The display control device according to claim 11, wherein, when a plurality of persons are included in the image,
determining whether or not the display device for displaying content is included in the visual field of the person included in the image comprises determining whether or not the display device is included in the visual field of each person,
determining whether or not the display device is included in the central visual field comprises determining whether or not the display device is included in the central visual field of each person, and
switching the content comprises switching the content when there is no person whose central visual field includes the display device among persons whose visual fields include the display device among the plurality of persons.

15. The display control device according to claim 11, wherein determining whether or not the display device is included in the central visual field comprises determining whether or not the display device is included in the central visual field within the visual field when the visual field determination unit determines that the display device is included in the visual field.

16. The display control device according to claim 11, wherein the one or more hardware-processors are configured to perform the plurality of operations according to the one or more programs stored in the one or more memories.

17. A display control method comprising:
determining, by a visual field determination unit, whether or not a display device for displaying content is included in a visual field of a person included in an image captured by an imaging device that images a region around the display device;
determining, by a central visual field determination unit, whether or not the display device is included in a central visual field within the visual field; and
determining, by a change determination unit, whether or not to temporarily change a display mode of the display device displaying first content before the content is switched from the first content displayed on the display device to second content to be subsequently displayed when it is determined that the display device is included in the visual field but is not included in the central visual field.

18. A non-transitory computer-readable storage medium that stores computer-executable programs that cause, when executed by one or more computers, the one or more computers to:
determine whether or not a display device for displaying content is included in a visual field of a person included in an image captured by an imaging device that images a region around the display device;
determine whether or not the display device is included in a central visual field within the visual field; and
determine whether or not to temporarily change a display mode of the display device displaying first content before the content is switched from the first content displayed on the display device to second content to be subsequently displayed when it is determined that the display device is included in the visual field but is not included in the central visual field.

19. A display control method comprising:
determining, by a visual field determination unit, whether or not a display device is included in a visual field of a person included in an image captured by an imaging device that images a region around the display device that displays content having a finite playback period of time as digital signage;
determining, by a central visual field determination unit, whether or not the display device is included in a central visual field within the visual field; and
switching, by a content switching unit, the content from first content to second content to be subsequently displayed even if the playback of the first content displayed on the display device is in progress when it is determined that the display device is included in the visual field but is not included in the central visual field.

20. A non-transitory computer-readable storage medium that stores computer-executable programs that cause, when executed by one or more computers, the one or more computers to:
determine whether or not a display device is included in a visual field of a person included in an image captured by an imaging device that images a region around the display device that displays content having a finite playback period of time as digital signage;
determine whether or not the display device is included in a central visual field within the visual field; and
switch the content from first content to second content to be subsequently displayed even if the playback of the first content displayed on the display device is in progress when it is determined that the display device is included in the visual field but is not included in the central visual field.

* * * * *